(12) United States Patent
Tasaki et al.

(10) Patent No.: US 10,451,735 B2
(45) Date of Patent: Oct. 22, 2019

(54) INFORMATION PROCESSING DEVICE, INFORMATION PROCESSING METHOD, AND VEHICLE

(71) Applicant: Kabushiki Kaisha Toshiba, Minato-ku (JP)

(72) Inventors: Tsuyoshi Tasaki, Yokohama (JP); Yuma Sano, Kawasaki (JP); Rie Katsuki, Kawasaki (JP)

(73) Assignee: Kabushiki Kaisha Toshiba, Minato-ku (JP)

( * ) Notice: Subject to any disclaimer, the term of this patent is extended or adjusted under 35 U.S.C. 154(b) by 211 days.

(21) Appl. No.: 15/438,059

(22) Filed: Feb. 21, 2017

(65) Prior Publication Data
US 2017/0343669 A1    Nov. 30, 2017

(30) Foreign Application Priority Data

May 27, 2016  (JP) .................................. 2016-106481

(51) Int. Cl.
*G01S 17/06*    (2006.01)
*G06T 7/66*    (2017.01)
(Continued)

(52) U.S. Cl.
CPC .............. *G01S 17/06* (2013.01); *G01S 17/89* (2013.01); *G05D 1/0088* (2013.01); *G05D 1/024* (2013.01); *G05D 1/0248* (2013.01); *G05D 1/0274* (2013.01); *G06K 9/00214* (2013.01); *G06K 9/00805* (2013.01); *G06T 7/20* (2013.01); *G06T 7/521* (2017.01); *G06T 7/593* (2017.01); *G06T 7/66* (2017.01); *G06T 7/73* (2017.01); *G08G 1/165* (2013.01); *G08G 1/166* (2013.01);
(Continued)

(58) Field of Classification Search
CPC . G01S 17/06; G01S 17/89; G06T 7/66; G06T 7/73; G06T 7/20; G05D 1/0088; G05D 1/024; G05D 1/0248; G05D 1/0274; G06K 9/00214; G06K 9/00805; G08G 1/165; G08G 1/166
USPC .......................................................... 701/28
See application file for complete search history.

(56) References Cited

U.S. PATENT DOCUMENTS 8,126,642 B2 * 2/2012 Trepagnier ............ G01S 17/023
    701/423
8,300,048 B2  10/2012 Hayashi et al.
(Continued)

FOREIGN PATENT DOCUMENTS

EP    0 656 532 A2   6/1995
EP    1 780 675 A1   5/2007
(Continued)

*Primary Examiner* — Thomas G Black
*Assistant Examiner* — Luat T Huynh
(74) *Attorney, Agent, or Firm* — Oblon, McClelland, Maier & Neustadt, L.L.P.

(57) ABSTRACT

An information processing device includes processing circuitry. The processing circuitry obtain target information that indicates at least one of a distance to a target object or a position of the target object. The processing circuitry generate, based on the target information, map information of a space including a plurality of areas, the map information indicating presence or absence of the target object in a first area included in the plurality of areas, and a detailed position of the target object in the first area.

20 Claims, 8 Drawing Sheets

(51) Int. Cl.
*G06T 7/73* (2017.01)
*G01S 17/89* (2006.01)
*G05D 1/00* (2006.01)
*G05D 1/02* (2006.01)
*G06T 7/20* (2017.01)
*G06K 9/00* (2006.01)
*G08G 1/16* (2006.01)
*G06T 7/521* (2017.01)
*G06T 7/593* (2017.01)

(52) U.S. Cl.
CPC ............... *G05D 2201/0213* (2013.01); *G06T 2207/30252* (2013.01); *G06T 2207/30261* (2013.01)

(56) References Cited

U.S. PATENT DOCUMENTS

| | | | |
|---|---|---|---|
| 9,909,888 B2 * | 3/2018 | Akiyama | G01C 21/3461 |
| 2010/0226544 A1 * | 9/2010 | Uchida | B60R 1/00 382/107 |
| 2013/0253754 A1 * | 9/2013 | Ferguson | G05D 1/0231 701/28 |

FOREIGN PATENT DOCUMENTS

| | | |
|---|---|---|
| EP | 2 615 595 A1 | 7/2013 |
| EP | 2 851 841 A2 | 3/2015 |
| EP | 2 940 656 A1 | 11/2015 |
| JP | 2009-157735 | 7/2009 |
| JP | 4650750 | 3/2011 |
| JP | 2016-74053 | 5/2016 |

\* cited by examiner

INFORMATION PROCESSING DEVICE, INFORMATION PROCESSING METHOD, AND VEHICLE

CROSS-REFERENCE TO RELATED APPLICATIONS

This application is based upon and claims the benefit of priority from Japanese Patent Application No. 2016-106481, filed on May 27, 2016; the entire contents of which are incorporated herein by reference.

FIELD

An embodiment described herein relates generally to an information processing device, an information processing method, and a vehicle.

BACKGROUND

There are mobile objects that detect objects, such as obstacles, located around and move while avoiding the detected objects. For example, a technology has been proposed for moving a mobile object using map information in which information indicating the presence or absence of obstacles in each area (grid) formed by dividing the entire area of movement according to a certain size.

However, in the conventional technology, since the presence or absence of obstacles can be determined only in the unit of areas of a certain size, there are times when the movement of the mobile object cannot be controlled in an appropriate manner.

DETAILED DESCRIPTION

According to one embodiment, an information processing device includes processing circuitry. The processors obtain target information that indicates at least one of a distance to a target object or a position of the target object. The processing circuitry generate, based on the target information, map information of a space including a plurality of areas, the map information indicating presence or absence of the target object in a first area included in the plurality of areas, and a detailed position of the target object in the first area.

An exemplary embodiment of an information processing device according to the invention is explained below in detail with reference to the accompanying drawings.

The information processing device according to the embodiment generates map information that not only indicates the presence or absence of a target object (obstacle) in an area but also indicates the detailed position of the target object in that area. Hence, the movement of a mobile object can be controlled in a more appropriate manner. For example, the information processing device according to the embodiment is installed in a vehicle such as an automobile (an example of a mobile object). The information processing device refers to detailed positions, sets the areas to be avoided during the movement, and controls the movement of the vehicle. As a result, even if the roads are narrow, it becomes possible to move in a safer and more reliable manner.

The mobile object is not limited to a vehicle, and other examples of the mobile object include a robot, a ship, and a flying object (such as an airplane or a drone). Moreover, the mobile object either can be an autonomous mobile object or can be a manned mobile object.

Figure 1:
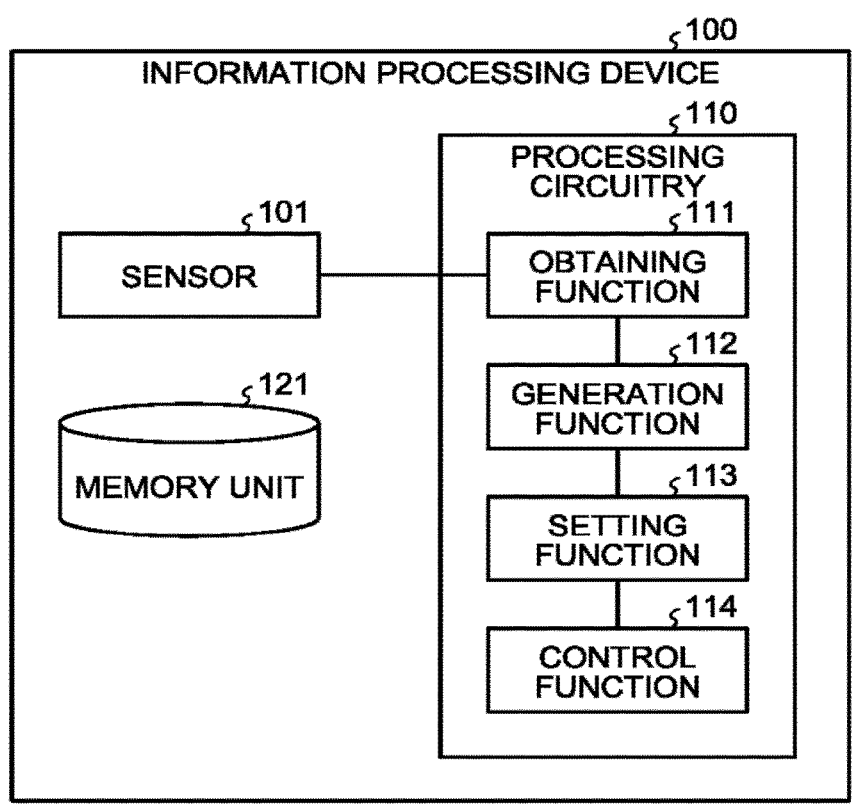
FIG. 1 is a block diagram of an information processing device according to an embodiment.

FIG. 1 is a block diagram illustrating an exemplary configuration of an information processing device 100 according to the embodiment. Ac illustrated in FIG. 1, the information processing device 100 includes a processing circuitry 110, a sensor 101, and a memory unit 121. The memory unit 121 and the sensor 101 are electrically connected to the processing circuitry 110.

The sensor 101 is a sensor for detecting the surrounding target objects. Examples of the sensor 101 include an image sensor (a stereo camera) and a distance sensor ouch as a laser sensor. The sensor 101 outputs detection information to the processing circuitry 110.

The memory unit 121 is used to store a variety of data. For example, the memory unit 121 is used to store map information generated by a generation function 112. The memory unit can be implemented using a memory medium such as a hard disk drive (FDD), a solid state drive (SSD), a read only memory (ROM), or a memory card in which the information can be stored at least in a magnetic manner, or in an optical manner, or in an electrical manner. Moreover, there is no limitation to have only a single memory medium constituting the memory unit 121. Alternatively, the memory unit 121 can be configured using a plurality of memory media. Furthermore, the memory unit 121 can be substituted with an external memory device installed on the outside of the information processing device 100.

The processing circuitry 110 has an obtaining function 111, the generation function 112, a setting function 113, and a control function 114. Herein, the obtaining function 171, the generation function 112, the setting function 113, and the control function 114 are examples of an obtaining unit, a generating unit, a setting unit, and a control unit, respectively. Regarding these processing functions, the explanation is given later.

The processing functions implemented in the information processing device 100 are, for example, stored in the form of computer programs in the memory unit 121. The processing circuitry 110 represents a processor that reads a computer program from the memory unit 121 and executes the computer program so that the corresponding function is implemented. Thus, when the processing circuitry 110 has read all computer programs, the functions illustrated in the processing circuitry 110 in FIG. 1 are implementable.

Meanwhile, in FIG. 1, although only a single processing circuitry 110 is illustrated, it is alternatively possible to configure the processing circuitry 110 by combining a plurality of independent processors. Moreover, either each processing function can be configured as a computer program that the processing circuitry 110 executes, or some or all of the processing functions can be installed in dedicated and independent execution circuits. That is, the processing functions can be implemented using software, or can be implemented using hardware, or can be implemented using a combination of software and hardware.

Meanwhile, the term "processor" in the explanation given above implies, for example, any of the following circuits: a central processing unit (CPU), a graphical processing unit (GPU), an application specific integrated circuit (ASIC), a programmable logic device (such as a simple programmable logic device (SPLD) or a complex programmable logic device (CPLD)), and a field programmable gate array (FPGA).

The processor reads the computer programs stored in the memory unit 121 and implements the functions. Herein, instead of storing the computer programs in the memory unit 121, it is alternatively possible to directly embed the computer programs in the processing circuitry. In that case, the processor reads the computer programs embedded in the circuitry and implements the functions.

The obtaining function 111 obtains target information indicating at least one of the distances to target objects or the positions of the target objects.

For example, when an image sensor is used as the sensor 101, the obtaining function 111 detects feature points in the image received from the sensor 101, tracks the feature points in the image in chronological order, and obtains the distances to and the positions of the surrounding feature points of the concerned mobile object. The set of feature points obtained in this manner (for example, a three-dimensional point group) is used as the target information.

Alternatively, for example, when a laser sensor is used as the sensor 101, the obtaining function 111 makes use of the phase difference with the reflected light at the time of laser irradiation or makes use of the time to reflection, and obtains the distances to or the positions of the points onto which the laser is irradiated. The set of points obtained in this manner (for example, a three-dimensional point group) is used as the target information.

Meanwhile, the sensor 101 can be a laser sensor that performs two-dimensional laser irradiation (performs laser irradiation with the height fixed) or can be a laser sensor that performs three-dimensional laser irradiation (performs laser irradiation with the height not fixed). In the case in which the sensor 101 performs two-dimensional laser irradiation, the target information represents a set of two-dimensional points (present on the plane with reference to the height of laser irradiation). In the case in which the sensor 101 performs three-dimensional laser irradiation, the target information represents a set of three-dimensional points. In the following explanation, the points included in such a set of points are sometimes called target points.

The generation function 112 generates map information based on the target information. For example, the generation function 112 generates map information indicating the presence or absence or a target object in a particular area (a first area), which is one of a plurality of areas formed by dividing the space surrounding the concerned mobile object, and indicating the detailed position of the target object in that particular area.

Figure 2:
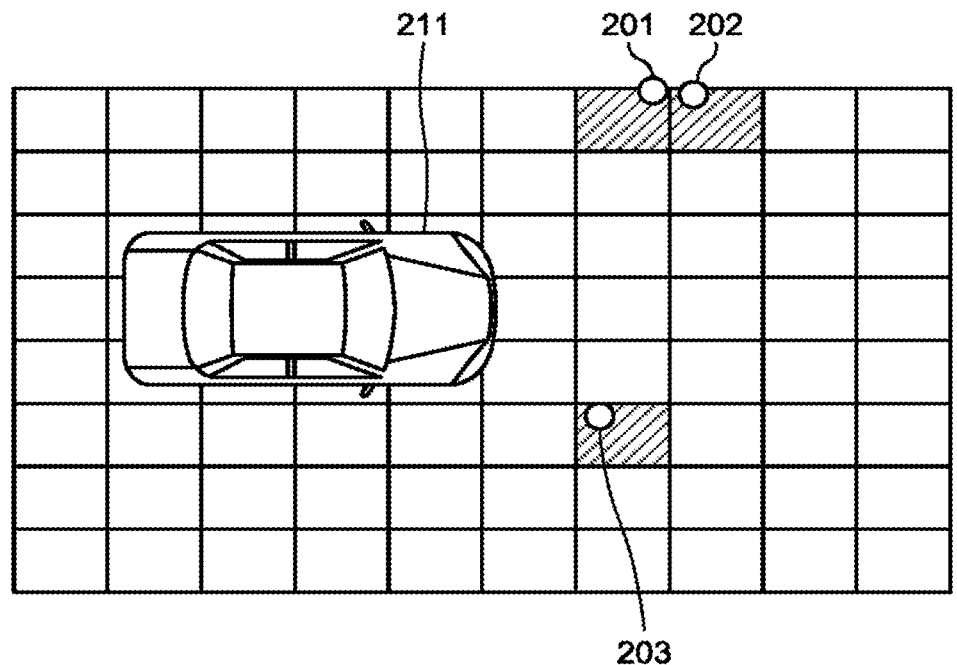
FIG. 2 is a diagram illustrating examples of map information.
Figure 3:
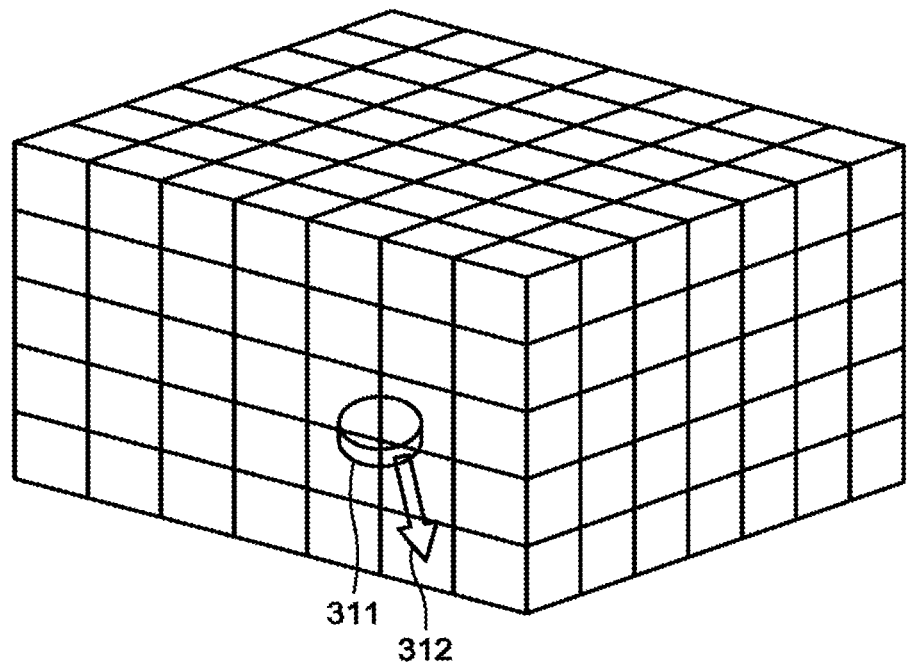
FIG. 3 is a diagram illustrating examples of map information.

Given below is the explanation of an example of a generation operation for generating map information. The generation function 112 firstly divides the space surrounding the concerned mobile object. FIGS. 2 and 3 are diagrams illustrating examples of map information. In FIG. 2, planar (two-dimensional) map information and rectangular divided areas are used. However, the map information need not be two-dimensional information, and the areas need not be rectangular in shape. Alternatively, for example, as illustrated in FIG. 3, non-planar steric map information and areas can be used.

In FIG. 2 is illustrated an example in which a mobile object 211 representing a vehicle moves rightward. In FIG. 3 is illustrated an example in which a flyable mobile object 311 moves in a direction 312.

The generation function 112 sets, in such areas from among a plurality of areas from which the target information is obtained, information indicating that a target object is present (for example, a flag indicating the presence or absence of a target object). Herein, in an area having the number of target points included therein, from among the obtained target points, to be equal to or greater than a threshold value; the generation function 112 can set information indicating that a target object is present. In FIG. 2, the areas in which a target object is present are illustrated with diagonal lines, while the areas in which no target object is present are illustrated in white.

The method for determining whether or not a target object is present is not limited to the method in which the number of target points is compared with a threshold value. Alternatively, any conventional method can be implemented. For example, a method can be implemented in which position information of such areas which were previously treated as target objects is used in chronological order and the presence or absence of target objects is determined by performing Bayes' estimation.

Regarding each area in which a target object is present, the generation function 112 sets the detailed position of the target object in that area. Examples of the detailed position include: the coordinate values obtained by taking the average of the coordinate values of the target point group in the area; and the coordinate values of the target point at the shortest distance from the mobile object. In FIG. 2, positions 201, 202, and 203 represent the detailed positions that have been set.

Meanwhile, depending on the number of target points in an area, the detailed position to be set can be changed. For example, when the number of target points in an area is equal to or greater than a threshold value, the coordinate values obtained by taking an average of the coordinate values of the target point group can be set as the detailed position. On the other hand, when the number of target points in an area is smaller than the threshold value, the coordinate values of the target point at the shortest distance from the mobile object can be set as the detailed position.

Figure 4:
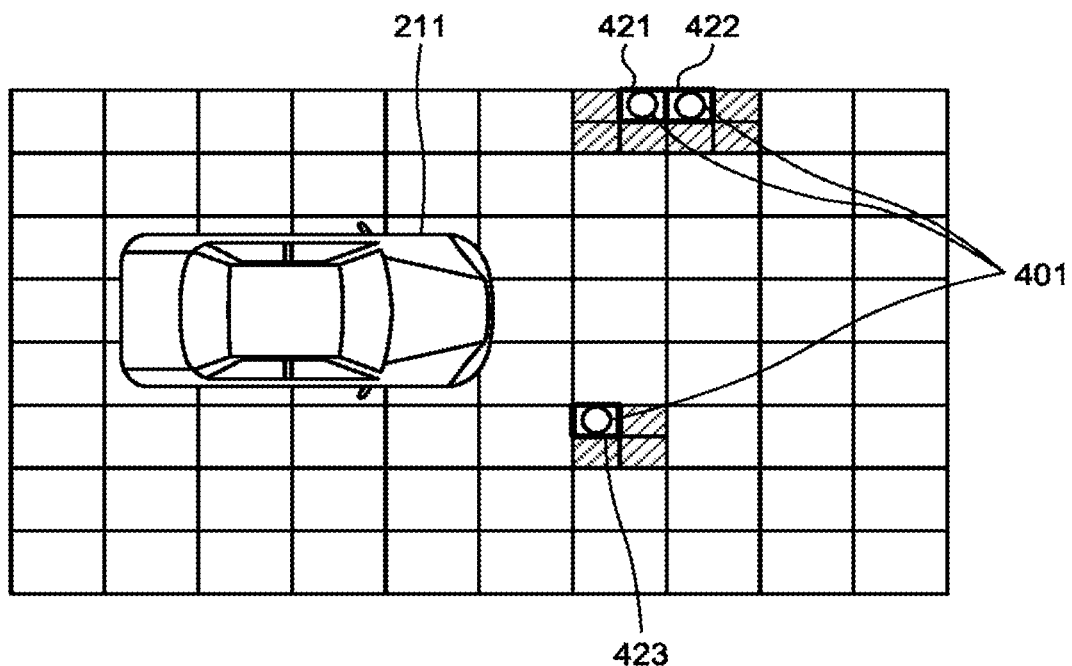
FIG. 4 is a diagram illustrating examples of map information.

FIG. 4 is a diagram illustrating another example of map information. As illustrated in FIG. 4, the rectangular areas are further divided into smaller areas; and the gravity center coordinate values of small areas 401, which include the highest number of target points, can be used as the detailed positions. In FIG. 4, positions 421, 422, and 423 represent the detailed positions that have been set.

The generation function 112 outputs the map information, in which the information indicating the detailed positions is set, to the setting function 113.

According to the positional relationship between the representative position and the detailed position in an area in which a target object is present; the setting function 113 sets, in the map information, information (surrounding information) indicating that the surrounding areas of the concerned area represent the surroundings of the target object. For example, with the areas included in the map information (the areas formed by dividing the space) serving as the unit, information indicating the areas that represent the surroundings of the target object (such as a flag indicating whether or not an area is a surrounding area) can be set as the surrounding information. Alternatively, independently of the areas included in the map information, information indicating the range of surrounding areas can be set as the surrounding information. For example, the surrounding information can be used in determining whether or not to avoid the movement (passing) of the mobile object through the corresponding areas.

Figure 5:
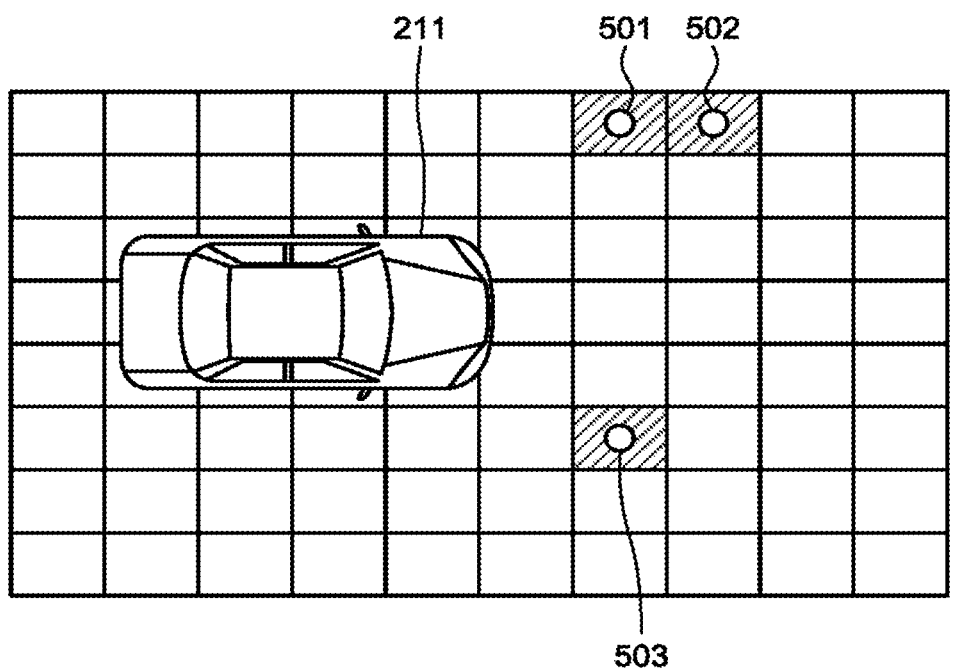
FIG. 5 is a diagram illustrating examples of representative positions.

Regarding each area in which a target object is present, the setting function ill calculates the representative position of that area. The representative position can be, for example, the position of the center of gravity of that area. In FIG. 5, positions 501, 502, and 503 represent representative positions.

Figure 6:
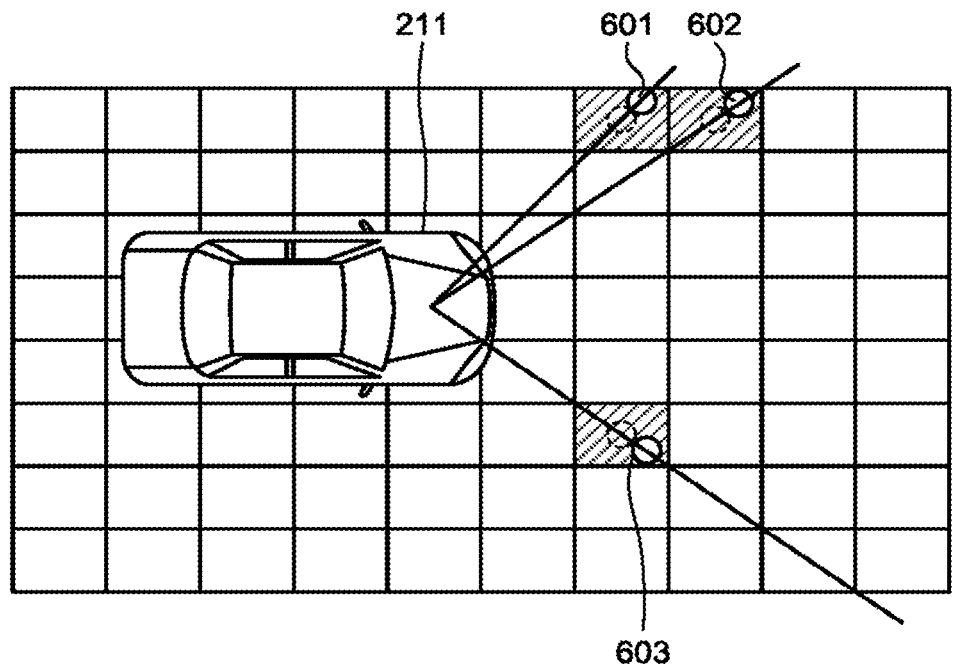
FIG. 6 is a diagram illustrating examples of representative positions.

A representative position can be changed from the position of the center of gravity according to the velocity of the mobile object. FIG. 6 is a diagram illustrating an example of the changed representative positions. As illustrated in FIG. 6, when the velocity of the mobile object is high, representative positions 601, 602, and 603 can be moved to positions that are separated from the respective positions of the center of gravity in the direction away from the mobile object and that are on the lines joining the respective positions of the center of gravity and the mobile object. Herein, the distance for separation either can be constant or can be kept variable according to the velocity. Moreover, either instead of changing the representative positions or in addition to changing the representative positions, the detailed positions can also be changed. For example, when the velocity of the mobile object is high, the detailed positions can be changed in the directions toward the mobile object. In this way, when the velocity of the mobile object is equal to or greater than a threshold value, the setting function 113 can at least either move the representative positions in the directions away from the mobile object or move the detailed positions in the directions toward the mobile object.

The setting function 113 sets the surrounding information according to the positional relationship between the representative positions, which are calculated in the abovementioned manner, and the detailed positions. For example, in each area, the setting function 113 compares a distance d between the mobile object and the representative position with a distance D between the mobile object and the detailed position. If D≤d is satisfied, then the setting function 1 sets the surrounding information in the areas surrounding the concerned area. Meanwhile, the position serving as the starting point for measuring the distance (i.e., a particular position) is not limited to the mobile object. Alternatively, for example, the road centerline can be used.

Figure 7:
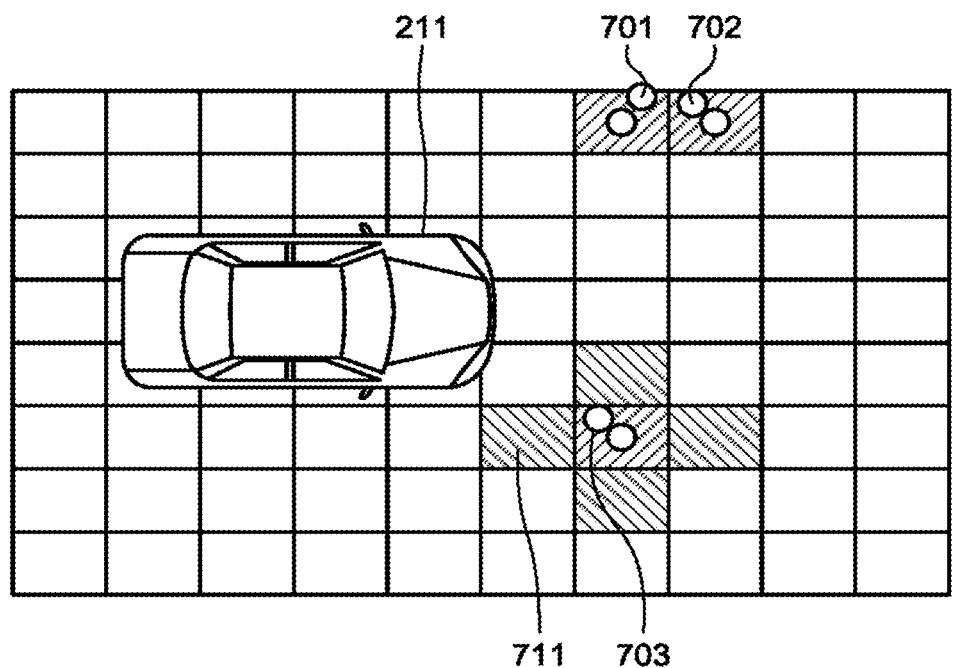
FIG. 7 is a diagram illustrating examples of areas in which surrounding information is set.
Figure 8:
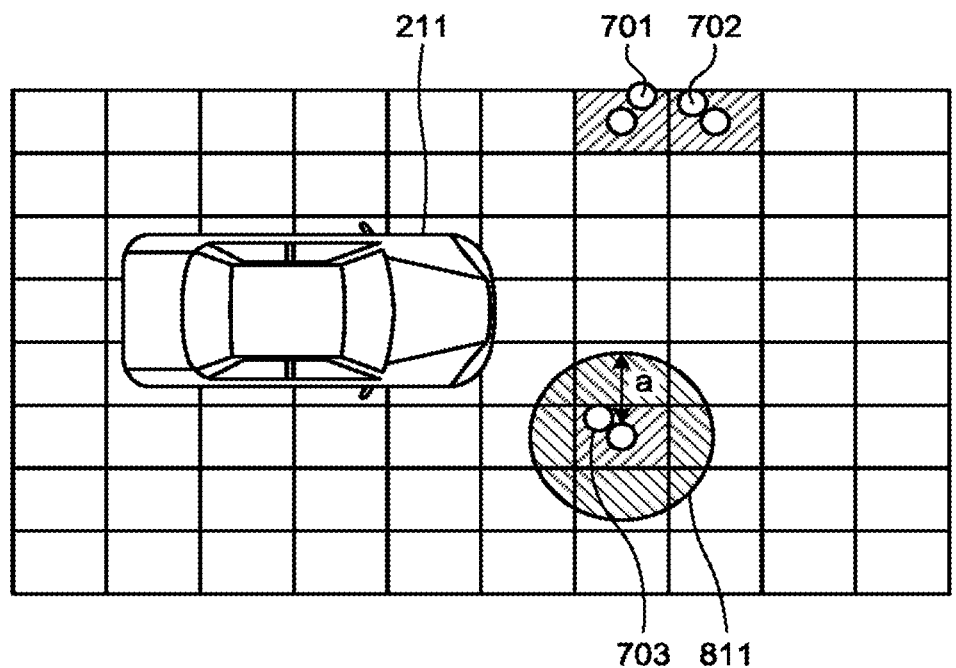
FIG. 8 is a diagram illustrating examples of areas in which surrounding information is set.
Figure 9:
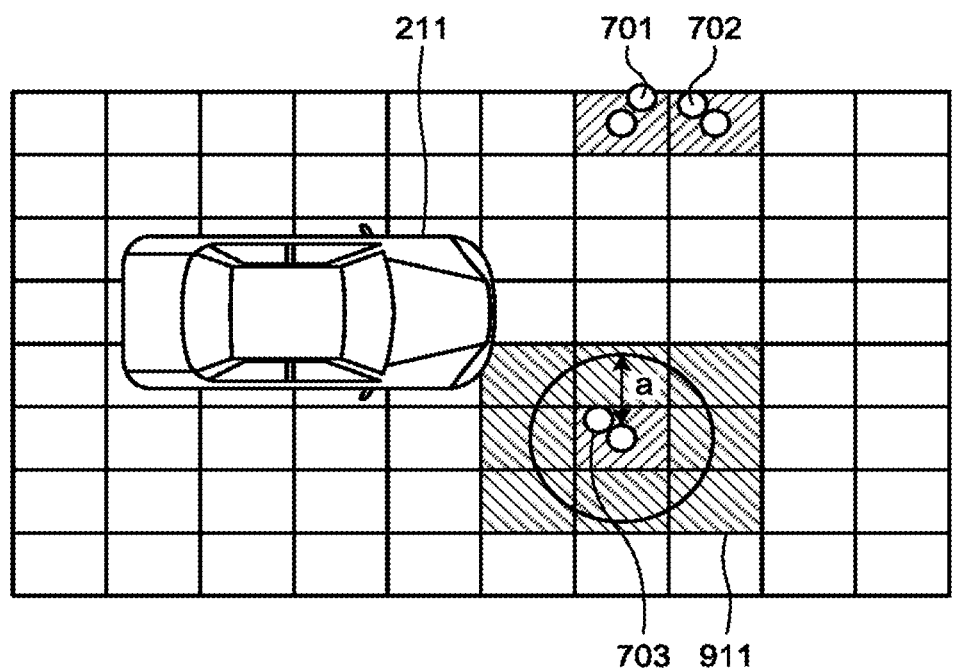
FIG. 9 is a diagram illustrating examples of areas in which surrounding information is set.
Figure 10:
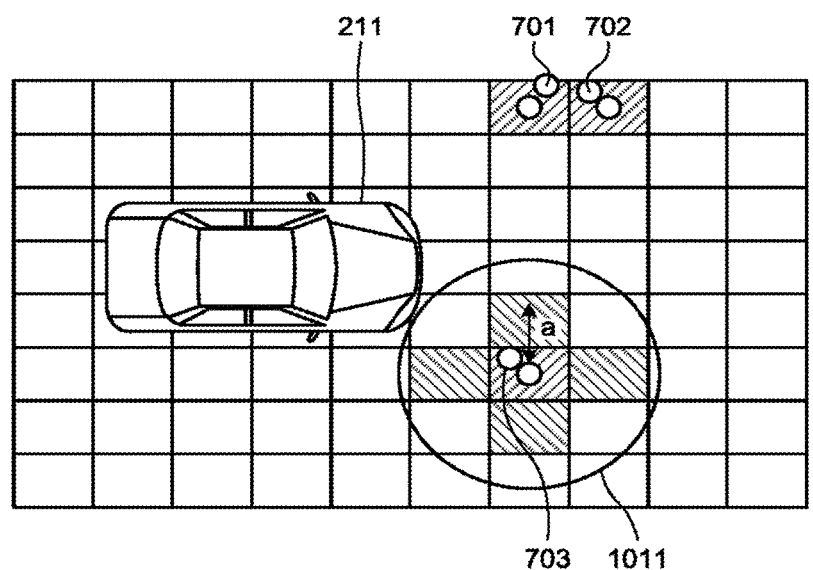
FIG. 10 is a diagram illustrating examples areas in which surrounding information is set.

FIGS. 7 to 10 are diagrams illustrating examples of areas (surrounding areas) in which the surrounding information is set. For example, the setting function 113 sets the surrounding information in the areas positioned at a certain distance from the position of the center of gravity of the area in which a target object is present. In the example illustrated in FIG. 7, the distance D between the mobile object 211 and a detailed position 703 is equal to or smaller than the distance d between the mobile object 211 and the representative positions 701, 702. Hence, the surrounding information is set in surrounding areas 711. As illustrated in FIG. 7, the set information can be set in the areas 711 that have the Manhattan distance from the position of the center of gravity to be equal to or smaller than one. As illustrated in FIG. 8, the surrounding information can be set in an area 811 that has the Euclidean distance from the position of the center of gravity to be equal to or smaller than a. In FIG. 8 is illustrated an example in which an area independent of the areas included in the map information is set as the surrounding information. As illustrated in FIG. 9, the surrounding information can be set in all surrounding areas 911 that are reachable from the position of the center of gravity at the distance a. As illustrated in FIG. 10, the surrounding information can be set in an area 1011 that fits inside the circle having the radius equal to the distance a from the position of the center of gravity.

Meanwhile, depending on the positional relationship between the representative positions and the detailed positions, the surrounding information can be set in only some of the surrounding areas from among the surrounding areas of the area in which a target object is present. For example, with reference to FIG. 7, the detailed positions are present at the upper left of the respective representative positions. Hence, from among the four areas having the Manhattan distance of one, the surrounding information can be set in the left-side area and the right-side area. With reference to FIG. 8, in the circle centered on the representative position and having the radius a, the surrounding information can be set in some of the areas in the upper left portion.

Alternatively, only if the number of target points in an area is equal to or smaller than a threshold value, the setting function 113 can set the surrounding information in the surrounding areas of the concerned area. As a result, for example, even in the case in which it is not certain whether a target object is present; passing through that area can be avoided by referring to the surrounding information.

The setting function 113 outputs the map information, which indicates the presence or absence of target objects along with the surrounding information, to the control function 114. When the surrounding information is not required, the setting function 113 need not be used.

The control function 114 performs a variety of control using the map information, which indicates the presence or absence of the target objects and the surrounding information. For example, the control function 114 controls the movement of the mobile object in such a way that the mobile object does not pass through the areas indicated to be the surroundings of the target objects in the surrounding information. In that case, the control function 114 calculates a route that neither passes through the areas in which a target object is present nor passes through the areas in which the surrounding information is set; and performs control to move the mobile object along that route. Alternatively, the control function 114 can perform control in which only the areas in which a target object is present are avoided and deceleration occurs in the areas in which the surrounding information is set.

The control function 114 can perform control in such a way that, when the surrounding information is set, the detection method for detecting the target objects is changed. For example, when an image sensor (a camera) is used as the sensor 101, regarding each area having the surrounding information set in the corresponding surrounding areas (i.e., each area in which a target object is present), the control function 114 can perform control to take images at a higher resolution by zooming. Moreover, the control function 114 can further use another sensor different from the sensor 101 and detect the target objects.

Figure 11:
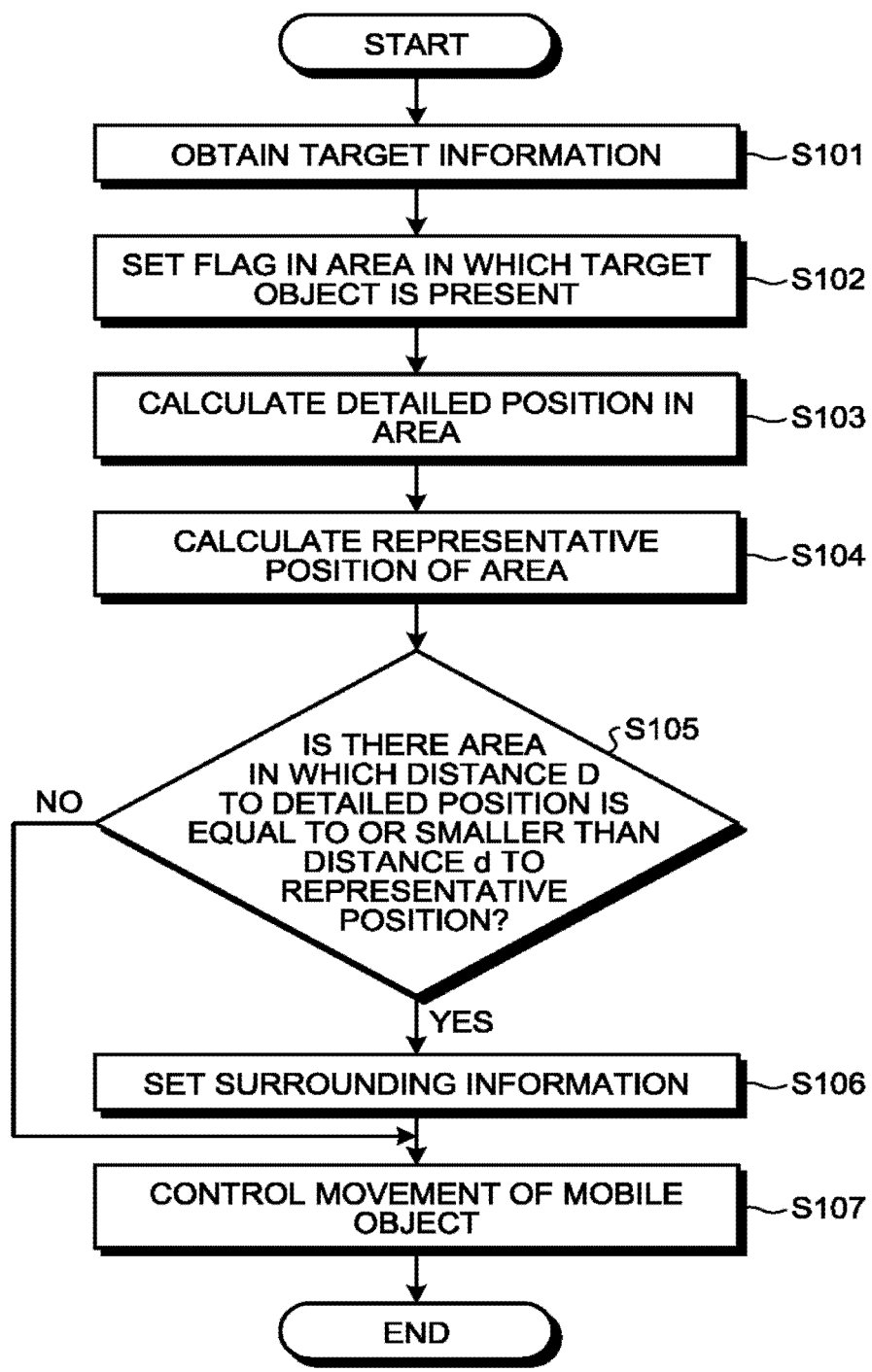
FIG. 11 is a flowchart for explaining an example of information processing performed according to the embodiment.

Explained below with reference to FIG. 11 is the information processing performed in the information processing device configured in the abovementioned manner according to the embodiment. FIG. 11 is a flowchart for explaining an example of the information processing performed according to the embodiment.

The obtaining function 111 obtains target information based on the information detected by the sensor 101 (Step S101). For example, the obtaining function 111 obtains, from the detected information, a set of target points surrounding the mobile object.

The generation function 112 sets information (such as a flag) indicating that, from among a plurality of areas, the areas from which the target information is obtained have a target object present therein (Step S102). Regarding each area in which a target object is present, the generation function 112 calculates the detailed position of the target object in that area (Step S103).

Regarding each area in which a target object is present, the setting function 113 calculates the representative position of that area (Step S104). Then, the setting function 113 determines whether or not there is any area in which the distance D from the mobile object (a particular position) to the detailed position is equal to or smaller than the distance d from the mobile object to the representative position (Step S105).

If such an area is present (Yes at Step S105), then the setting function 113 sets surrounding information in the areas surrounding the concerned area (Step S106). After the surrounding information is set or if there is no area in which the distance D is equal to or smaller than the distance d (No at Step S105), then the control function 114 refers to the map information and controls the movement of the mobile object (Step S107). For example, the control function 114 decides on a route that avoids the areas in which a target object is present as well as avoids the areas in which the surrounding information is set, and performs control to move the mobile object on the decided route.

(Modification Example)

In the embodiment described above, the explanation is given for an example in which the information processing device is installed in a mobile object such as a vehicle. Alternatively, instead of installing it in a mobile object, the information processing device can be implemented as an external device on the outside of mobile objects. For example, an information processing device according to a modification example generates map information by monitoring target objects (obstacles) and mobile objects from the outside, and provides the map information to the mobile objects.

Figure 12:
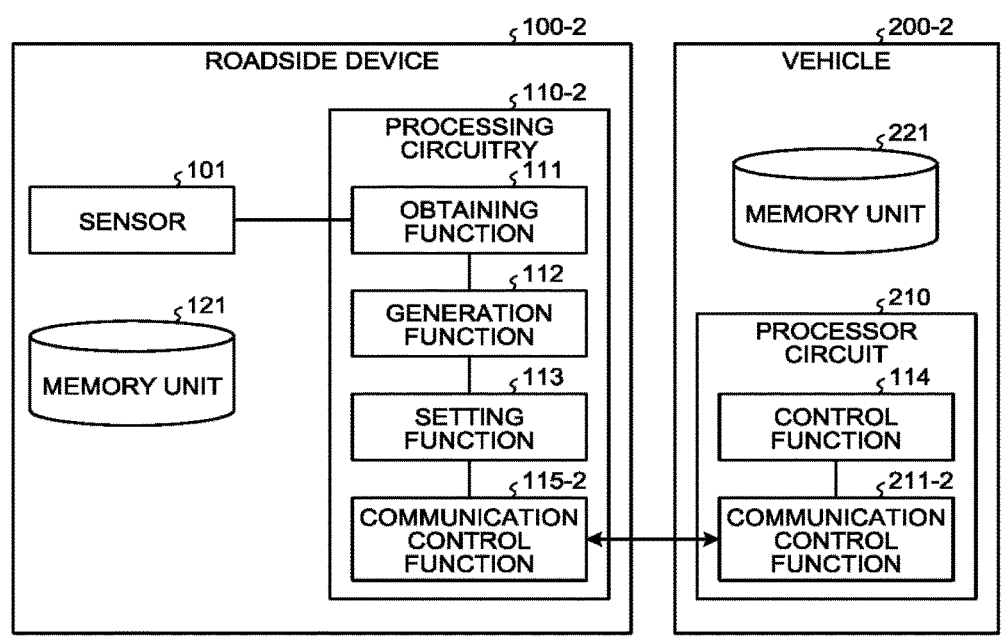
FIG. 12 is a block diagram of an information processing system according to a modification example.

FIG. 12 is a diagram illustrating an example of an information processing system that includes the information processing device according to the modification example. The information processing system includes a roadside device 100-2 functioning as the information processing device and includes a vehicle 200-2. Herein, the number of each device is not limited to one, and it is possible to have an arbitrary number of each device.

The roadside device 100-2 is installed in, for example, a traffic light on a road. The roadside device 100-2 includes a processing circuitry 110-2, the sensor 101, and the memory unit 121. Regarding the configuration and the functions identical to those illustrated in FIG. 1 according to the embodiment, the same reference numerals are used and the same explanation is not repeated.

As compared to the embodiment, the processing circuitry 110-2 differs in the way of including a communication control function 115-2 in place of the control function 114. The communication control function 115-2 controls the communication with external devices such as the vehicle 200-2. For example, the communication control function 115-2 controls wireless communication based on the IEEE 802.11p standard. The communication control function 115-2 sends, for example, map information to the vehicle 200-2 via wireless communication.

The vehicle 200-2 includes a memory unit 221 and a processing circuitry 210. The memory unit 221 is used to store a variety of data. For example, the memory unit 221 is used to store the map information received from the roadside device 100-2.

The processing circuitry 210 includes the control function 114 and a communication control function 211-2. The processing circuitry 210 is configured using one or more processors in an identical manner to the processing circuitry 110.

The communication control function 211-2 controls the communication with external devices such as the roadside device 100-2. For example, the communication control function 211-2 controls the wireless communication based on the IEEE 802.11p standard. The communication control function 211-2 receives, for example, the map information from the roadside device 100-2 via wireless communication.

In an identical manner to the embodiment described above, the control function 114 performs a variety of control using the map information. In the modification example, the control function 114 can be configured to make use of the map information received from the roadside device 100-2.

The information processing performed according to the modification example is identical to that explained with reference to FIG. 11. For example, the roadside device performs the operations from Steps S101 to S106, and the vehicle 200-2 performs the operation at Step S107.

However, the distribution of the functions between the roadside device 100-2 and the vehicle 200-2 is not limited to the example illustrated in FIG. 12. For example, the distribution can be done in the following ways.

(1) The roadside device: the sensor 101, the memory unit 121, and the communication control function 115-2.

The vehicle: the memory unit 221, the obtaining function 111, the generation function 112, the setting function 113, the control function 114, and the communication control function 211-2.

(2) The roadside device: the sensor 101, the memory unit the obtaining function 111, and the communication control function 115-2.

The vehicle: the memory unit 221, the generation function 112, the setting function 113, the control function 114, and the communication control function 211-2.

(3) The roadside device: the sensor 101, the memory unit 121, the obtaining function 111, the generation function 112, and the communication control function 115-2.

The vehicle: the memory unit 221, the setting function 113, the control function 114, and the communication control function 211-2.

As described above, in the information processing device according to the embodiment, in the map information that has the presence or absence of target objects set therein, the detailed positions of the target objects are further set. As a result of making such map information available, the movement of a mobile object can be controlled in an appropriate manner. For example, in the embodiment, whether or not to set areas to be avoided during the movement can be controlled according to the detailed positions. Hence, even if the road is narrow, the mobile object can be moved in a safe and reliable manner.

A computer program executed in the information processing device according to the embodiment is stored in advance in a read only memory (ROM).

Alternatively, the computer program executed in the information processing device according to the embodiment can be recorded as an installable file or an executable file in a computer-readable recording medium such as a compact disk read only memory (CD-ROM), a flexible disk (ED), a compact disk recordable (CD-R), or a digital versatile disk (DVD); and can be provided as a computer program product.

Still alternatively, the computer program executed in the information processing device according to the embodiment can be stored in a downloadable manner in a computer connected to a network such as the Internet. Still alternatively, the computer program executed in the information processing device according to the embodiment can be distributed over a network such as the Internet.

The computer program executed in the information processing device according to the embodiment can make a computer to function as the constituent elements described above. In that computer, a central processing unit (CPU) can read the computer program from a computer-readable memory medium into a main memory device, and execute the computer program.

The computer according to the embodiment executes the operations, which are explained in the embodiment, based on the computer program stored in a memory medium; and can be configured as a single device such as a personal computer or a microcomputer or can be configured as a system in which a plurality of devices is connected via a network. Moreover, the term "computer" according to the embodiment is an all-inclusive term not only limited to a personal computer but also applicable to a device that includes a processor and a microcomputer of an information processing device and that is capable of implementing the functions according to the embodiment using computer programs.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fail within the scope and spirit of the inventions.

What is claimed is:

1. An information processing device installed in a mobile object, comprising:
    a memory; and
    processing circuitry configured to
        obtain target information that indicates at least one of a distance to a target object in a space surrounding the mobile object or a position of the target object; and
        generate map information for each area of a plurality of areas formed by dividing the space, the map information indicating presence or absence of the target object in the area, the map information being information for controlling movement of the mobile object, wherein
    the processing circuitry generates the map information for a first area in which the target object exists, based on the target information,
    the map information indicating a detailed position of the target object in the first area, the first area being included in the plurality of areas.

2. The information processing device according to claim 1, wherein
    the processing circuitry further configured to set, according to positional relationship between a representative position of the first area and the detailed position, in the map information, surrounding information indicating that areas surrounding the first area represent surroundings of the target object.

3. The information processing device according to claim 2, wherein, when a distance between a particular position and the detailed position is equal to or smaller than a distance between the particular position and the representative position, the processing circuitry set the surrounding information in the map information.

4. The information processing device according to claim 2, wherein the representative position is a position of center of gravity of the first area.

5. The information processing device according to claim 2, wherein, when velocity of the mobile object moving in the space is equal to or greater than a threshold value, the processing circuitry set the surrounding information in the map information according to positional relationship formed between the representative position and the detailed position after at least either the representative position is moved in a direction away from the mobile object or the detailed position is moved in a direction toward the mobile object.

6. The information processing device according to claim 2, wherein the processing circuitry further configured to control movement of the mobile object in such a way that the mobile object does not pass through an area indicated in the surrounding information to be surrounding of the target object.

7. The information processing device according to claim 2, wherein the processing circuitry further configured to control movement of the mobile object in such a way that the mobile object decelerates while passing through an area indicated in the surrounding information to be surrounding of the target object.

8. The information processing device according to claim 2, wherein the processing circuitry further configured to, when the surrounding information is set, change a detection method to be used for detecting the target object.

9. The information processing device according to claim 2, wherein the processing circuitry
    obtain a plurality of sets of target information indicating positions of a plurality of points included in the target object, and
    when a number of the plurality of points is equal to or smaller than a threshold value, set the surrounding information in the map information.

10. The information processing device according to claim 1, wherein the processing circuitry
    obtain a plurality of sets of target information indicating positions of a plurality of points included in the target object, and
    the detailed position represents an average of positions of points included in the first area from among the plurality of points.

11. The information processing device according to claim 1, wherein the processing circuitry
obtain a plurality of sets of target information indicating positions of a plurality of points included in the target object, and
the detailed position represents a position of center of gravity of a small area, from among small areas formed by dividing the first area, having the highest number of the plurality of points.

12. The information processing device according to claim 1, wherein the processing circuitry
obtain a plurality of sets of target information indicating positions of a plurality of points included in the target object, and
the detailed position represents a position of a point at the shortest distance from the mobile object from among the plurality of points.

13. The information processing device according to claim 1, wherein the processing circuitry
obtain a plurality of sets of target information indicating positions of a plurality of points included in the target object,
when a number of points included in the first area is equal to or greater than a threshold value, the detailed position represents an average of positions of points included in the first area from among the plurality of points, and
when the number of points included in the first area is smaller than the threshold value, the detailed position represents a position of point at shorter distance from the mobile object than other points in the plurality of points.

14. A vehicle comprising:
a memory; and
processing circuitry configured to
obtain target information that indicates at least one of a distance to a target object in a space surrounding the vehicle or a position of the target object; and
generate map information for each area of a plurality of areas formed by dividing the space, the map information indicating presence or absence of the target object in the area, the map information being information for controlling movement of the vehicle, and
control movement of the vehicle based on the map information, wherein
the processing circuitry generates the map information for a first area in which the target object exists, based on the target information,
the map information indicating a detailed position of the target object in the first area, the first area being included in the plurality of areas.

15. An information processing method comprising:
obtaining target information that indicates at least one of a distance to a target object in a space surrounding a mobile object or a position of the target object;
generating map information for each area of a plurality of areas formed by dividing the space, the map information indicating presence or absence of the target object in the area, the map information being information for controlling movement of the mobile object,
generating the map information for a first area in which the target object exists, based on the target information,
the map information indicating a detailed position of the target object in the first area, the first area being included in the plurality of areas.

16. The information processing method according to claim 15, further comprising:
setting, according to positional relationship between a representative position of the first area and the detailed position, in the map information, surrounding information indicating that areas surrounding the first area represent surroundings of the target object.

17. The information processing method according to claim 15, wherein
the obtaining includes
obtaining a plurality of sets of target information indicating positions of a plurality of points included in the target object, and
the detailed position represents an average of positions of points included in the first area from among the plurality of points.

18. The information processing method according to claim 15, wherein
the obtaining includes
obtaining a plurality of sets of target information indicating positions of a plurality of points included in the target object, and
the detailed position represents a position of center of gravity of a small area, from among small areas formed by dividing the first area, having the highest number of the plurality of points.

19. The information processing method according to claim 15, wherein
the obtaining includes
obtaining a plurality of sets of target information indicating positions of a plurality of points included in the target object, and
the detailed position represents a position of a point at the shortest distance from the mobile object from among the plurality of points.

20. The information processing method according to claim 15, wherein
the obtaining includes
obtaining a plurality of sets of target information indicating positions of a plurality of points included in the target object,
when a number of points included in the first area is equal to or greater than a threshold value, the detailed position represents an average of positions of points included in the first area from among the plurality of points, and
when the number of points included in the first area is smaller than the threshold value, the detailed position represents a position of point at shorter distance from the mobile object than other points in the plurality of points.

* * * * *